(12) United States Patent
Zhao et al.

(10) Patent No.: US 9,232,412 B2
(45) Date of Patent: Jan. 5, 2016

(54) METHOD FOR MINIMIZATION OF DRIVE TESTS, METHOD FOR COLLECTING TERMINAL INFORMATION, TERMINAL, AND NETWORK ELEMENT

(71) Applicant: HUAWEI TECHNOLOGIES CO., LTD., Shenzhen (CN)

(72) Inventors: Dong Zhao, Shanghai (CN); Lan Zou, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 198 days.

(21) Appl. No.: 13/856,018

(22) Filed: Apr. 3, 2013

(65) Prior Publication Data

US 2013/0223233 A1    Aug. 29, 2013

Related U.S. Application Data

(63) Continuation of application No. PCT/CN2012/074631, filed on Apr. 25, 2012.

(30) Foreign Application Priority Data

Apr. 29, 2011  (CN) .......................... 2011 1 0111796

(51) Int. Cl.
  *H04L 12/26* (2006.01)
  *H04L 12/28* (2006.01)
  (Continued)

(52) U.S. Cl.
  CPC .............. *H04W 24/02* (2013.01); *H04W 24/10* (2013.01); *H04W 12/02* (2013.01); *H04W 12/08* (2013.01); *H04W 24/08* (2013.01)

(58) Field of Classification Search
  None
  See application file for complete search history.

(56) References Cited

U.S. PATENT DOCUMENTS 5,841,119 A      11/1998  Rouyrre et al.
2011/0249661 A1*  10/2011  Bae .............................. 370/338
(Continued)

FOREIGN PATENT DOCUMENTS

| CN | 101931981 | | 12/2010 |
| CN | 101990230 A | | 3/2011 |
| WO | WO2010036043 | * | 4/2010 |

OTHER PUBLICATIONS

Chinese Office Action dated May 29, 2014 in corresponding Chinese Patent Application No. 201110111796.4.

(Continued)

*Primary Examiner* — Edan Orgad
*Assistant Examiner* — Rebecca Song
(74) *Attorney, Agent, or Firm* — Staas & Halsey LLP

(57) ABSTRACT

The present invention discloses a method for minimization of drive tests, a method for collecting terminal information, a terminal, and a network element, which belongs to the field of communication technologies. The method includes: in a process of activating a minimization of drive tests MDT task, checking, by a network element, a consent type of a user corresponding to a selected terminal; sending a MDT task activation command to the selected terminal according to a check result of the consent type; after receiving measured data reported by the selected terminal, performing an operation according to a check result of the consent type. In embodiments of the present invention, check on user consent is implemented in a network detection process, thereby avoiding a case that a user equipment is forced to report personal information without permission of the user and improving the user experience.

18 Claims, 6 Drawing Sheets

(51) Int. Cl.
*H04W 24/02* (2009.01)
*H04W 24/10* (2009.01)
*H04W 12/02* (2009.01)
*H04W 24/08* (2009.01)
*H04W 12/08* (2009.01)

(56) References Cited

U.S. PATENT DOCUMENTS

| | | | |
|---|---|---|---|
| 2012/0015657 A1* | 1/2012 | Comsa | H04W 36/0094 455/436 |
| 2012/0088457 A1 | 4/2012 | Johansson et al. | |
| 2012/0108199 A1* | 5/2012 | Wang et al. | 455/405 |
| 2012/0120810 A1 | 5/2012 | Wang et al. | |
| 2012/0190364 A1* | 7/2012 | Wu | 455/436 |
| 2012/0208503 A1* | 8/2012 | Johansson | 455/411 |
| 2013/0303129 A1* | 11/2013 | Yi et al. | 455/411 |
| 2013/0324106 A1* | 12/2013 | Bodog | 455/422.1 |

OTHER PUBLICATIONS

International Search Report of Corresponding PCT Application PCT/CN2012/074631 mailed Aug. 2, 2012.
3GPP TSG-SA5 (Telecom Management), SA5#76, "Adding user consent handling in MDT activation", Change Request, Nokia Siemens Networks, Feb.28-Mar. 4, 2011, 3 pp.
3GPP TSG-SA WG3 Meeting #63, "Reply LS on MDT privacy", Apr. 11-15, 2011, 2 pp.
3GPP TSG-SA5 (Telecom Management), SA5 (Telecom Management), SA5#77, "Discussion paper for user consent implementation for management based MDT", May 9-13, 2011, Huawei, 5 pp.
3GPP™, "3$^{rd}$ Generation Partnership Project; Technical Specification Group Services and System Aspects; Telecommunication management; Subscriber and equipment trace; Trace control and configuration management (Release 10)", 3GPP TS 32.422 V10.3.0, Mar. 2011, pp. 1-111.
*Digital cellular telecommunications system (Phase 2+); Universal Mobile Telecommunications System (UMTS); LTE; Telecommunication management; Subscriber and equipment trace; Trace control and configuration management (3GPP TS 32.422 version 10.3.0 Release 10)*, ETSI TS 132 422 V10.3.0 (Apr. 2011), pp. 1-113.
*User consent handling in Management based MDT*, 3GPP TSG-RAN WG2 Meeting #73bis, R2-112306, Shanghai, China, Apr. 11-15, 2011 (3 pp.).
*Change Request, 32.422 CR 0106 rev 10.2.1*, 3GPP TSG-SA5 (Telecom Management), S5-111280, SA5#76, Feb. 28-Mar. 4, 2011, San Diego, USA (8 pp.).
Extended European Search Report, dated Jul. 15, 2013, in corresponding European Application No. 12776321.7 (11 pp.).
*GPS Methods*, www.utdallas.edu/.../GPSCLASS/GPScarrier . . . , (63 pp.).downloaded Aug. 31, 2015.
Wells, D., *Guide to GPS Positioning*, Canadian GPS Associates, plan.geomatics.ucalgary.ca/papers/guide_to_gps_positioning_ebook.pdf, Dec. 1986, May 1987, downloaded Aug. 31, 2015 (602 pp.).

\* cited by examiner

METHOD FOR MINIMIZATION OF DRIVE TESTS, METHOD FOR COLLECTING TERMINAL INFORMATION, TERMINAL, AND NETWORK ELEMENT

CROSS-REFERENCE TO RELATED APPLICATIONS

This application is a continuation of International Application No. PCT/CN2012/074631, filed on Apr. 25, 2012, which claims priority to Chinese Patent Application No. 201110111796.4, filed on Apr. 29, 2011, both of which are hereby incorporated by reference in their entireties.

FIELD OF THE INVENTION

The present invention relates to the field of network detection, and in particular, to a method for minimization of drive tests, a method for collecting terminal information, a terminal, and a network element.

BACKGROUND OF THE INVENTION

Currently, in operators' systems, the validity of all planning and adjustments performed on network systems, for example, coverage and capacity (Coverage and Capacity, C&C) optimization, mobility optimization, common channel parameter optimization, check on quality of service (Quality of Service, Qos), and the like, needs to be tested through driver-test to ensure that the optimizations are qualified. However, higher manual expenses are required to perform network detection through the driver-test. To reduce manual expenses, the prior art proposes a minimization of drive tests (Minimization of Drive Tests, MDT) project in the $3^{rd}$ generation partnership project (The 3rd Generation Partnership Project, 3GPP). The 3GPP MDT project modifies a signaling process or an operations, administration and maintenance (Operations, Administration and Maintenance, OAM) process, so that operators can collect desired wireless data according to requirements by using a terminal camping on the network. In this way, manual collection is replaced, the network planning and optimization efficiency is increased, and network verification and information feedback demands are met at a minimum cost.

The 3GPP MDT is categorized into two types: management-based MDT and signaling-based MDT. In the management-based MDT, an integration reference point agent (Integration Reference Point Agent, IRPAgent) manages all network elements involved in a MDT task, and a MDT command is executed only on target network elements delivered by the IRPAgent, and these network elements no longer forward/transmit the MDT command. In the signaling-based MDT, a core network home subscriber server (Home Subscriber Server, HSS) receives a MDT task command from the IRPAgent; after performing related processing on the received task command, the HSS forwards/transmits the MDT command to network elements involved in the signaling. The IRPAgent does not manage all the involved network elements directly. In the above two types of MDT, the IRPAgent specifies MDT configuration parameters for related network elements, and sends a request for activating a MDT task. In this process, for the management-based MDT, corresponding network elements, for example, an evolved Node B (evolved Node B, eNB) and a radio network controller (Radio Network Controller, RNC), select a user equipment (User Equipment, UE) for the MDT task according to given MDT selection conditions and UE capability, and then send a test command to the UE. For the signaling-based MDT, after receiving a MDT command from the IRPAgent, the HSS and a mobility management entity (Mobility Management Entity, MME) select a UE for the MDT task according to given conditions, for example, individual mobility station identity (Individual Mobility Station Identity, IMSI), and then sends a test command to the UE. The UE selected by using any one of the above methods reports measured values of the network to each related network element on a timing basis or on an event-triggered basis; each related network element forwards the received measured values to a trace collection device (Trace Collection device, TCE). Then, the measurement and report processes end. The TCE is specified by an integration reference point manager (Integration Reference Point Manager, IRPManager).

After analyzing the prior art, the prior art has at least following drawbacks: In the current MDT technology, the network actively selects a UE for measurement, and forcibly requests the UE to report measured data, terminal identifier, and even accurate position without permission of the user; however, the reported data involves users' privacy, and reporting data by the terminal increases burden on the terminal and therefore the terminal user may not desire to participate in the measurement. Therefore, the method for forcing the UE to execute operations may discontent the terminal user.

SUMMARY OF THE INVENTION

To overcome the drawback in the prior art that terminal user consent is not considered, embodiments of the present invention provide a method for minimization of drive tests, a method for collecting terminal information, a terminal, and a network element. The technical solutions provided in embodiments of the present invention are as follows:

In one aspect, a method for minimization of drive tests is provided, where the method includes: in a process of activating a minimization of drive tests MDT task, checking, by a network element, a consent type of a user corresponding to a selected terminal; sending a MDT task activation command to the selected terminal according to a check result of the consent type; after receiving measured data reported by the selected terminal, performing an operation according to the check result of the consent type.

In another aspect, a network element is provided, where the network element includes: a checking module, configured to: in a process of activating a MDT task, check, for the network element, a consent type of a user corresponding to a selected terminal; and an executing module, configured to: send a MDT task activation command to the selected terminal according to a check result of the consent type; and after receiving measured data reported by the selected terminal, perform an operation according to the check result of the consent type.

In another aspect, a network element is also provided, where the network element includes: a determining module, configured to determine whether a selected terminal is in a roaming state; and an executing module, configured to: if the selected terminal is in a roaming state, an MME refuses to send a user consent type corresponding to the selected terminal to an eNB, or modifies the user consent type corresponding to the selected terminal to be a consent type indicating that execution is disagreed, and sends the modified user consent type corresponding to the selected terminal to the eNB.

In another aspect, a method for collecting terminal information is also provided, where the method includes: obtaining a consent type of a terminal that records a radio link failure RLF and/or a handover failure HOF, where the consent type is whether the terminal user allows an OAM entity to collect the RLF and HOF information recorded by the terminal; determining whether the terminal allows the OAM entity to collect the RLF and/or HOF information recorded by the terminal according to the consent type; if the terminal allows the OAM entity to collect the RLF and/or HOF information recorded by the terminal, reporting the RLF and/or HOF information recorded by the terminal to the OAM entity.

In another aspect, a network element is also provided, where the network element includes: an obtaining module, configured to obtain a consent type of a terminal that records a radio link failure RLF and/or a handover failure HOF, where the consent type is whether the terminal user allows an OAM entity to collect the RLF and HOF information recorded by the terminal; and a determining module, configured to determine whether the terminal allows the OAM entity to collect the RLF and/or HOF information recorded by the terminal according to the consent type; if the terminal allows the OAM entity to collect the RLF and/or HOF information recorded by the terminal, report the RLF and/or HOF information recorded by the terminal to the OAM entity.

In the technical solutions provided in embodiments of the present invention, check on user consent is added in a network detection process; and the execution of a MDT task or a terminal information collection task is controlled according to the user consent, which fully considers the user experience, thereby avoiding a case that a user equipment is forced to report personal information without permission of the user.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and persons of ordinary skill in the art may still derive other drawings from the accompanying drawings without creative efforts.

DETAILED DESCRIPTION OF THE EMBODIMENTS

To make the objectives, technical solutions, and advantages of the present invention more comprehensible, the following further describes the embodiments of the present invention in detail with reference to the accompanying drawings.

Before the technology of the present invention is introduced, basic knowledge of the present invention is briefly introduced as follows:

A relationship between an IRPAgent and an IRPManager is a network-oriented management mechanism, which provides functions of network operation, maintenance, and administration. In an ITU-T telecommunication management network model, interactive roles in a 3GPP management process are an integration reference point manager (IRPManager) and an integration reference point agent (IRPAgent). The IRPManager is functionally equivalent to a network manager and responsible for the operation, maintenance, and management of the entire network; the IRPAgent is functionally equivalent to a network element manager and responsible for the operation, maintenance, and management of a certain type of device. A management interface between the IRPManager and the IRPAgent is called Itf-N (that is, a northbound interface). In the Itf-N interface, some function logic entities of the integration reference point (Integration Reference Point, IRP) are defined, for example, a basic configuration management integration reference point (Basic Configuration Management Integration Reference Point, Basic CM IRP), a bulk configuration management integration reference point (Bulk Configuration Management Integration Reference Point, Bulk CM IRP), and notification integration reference point (Notification Integration Reference Point, Notifications IRP). By using the functions provided by these integration reference points, the IRPAgent provides the IRPManager with OAM functions of the network.

Embodiment 1

Figure 1:
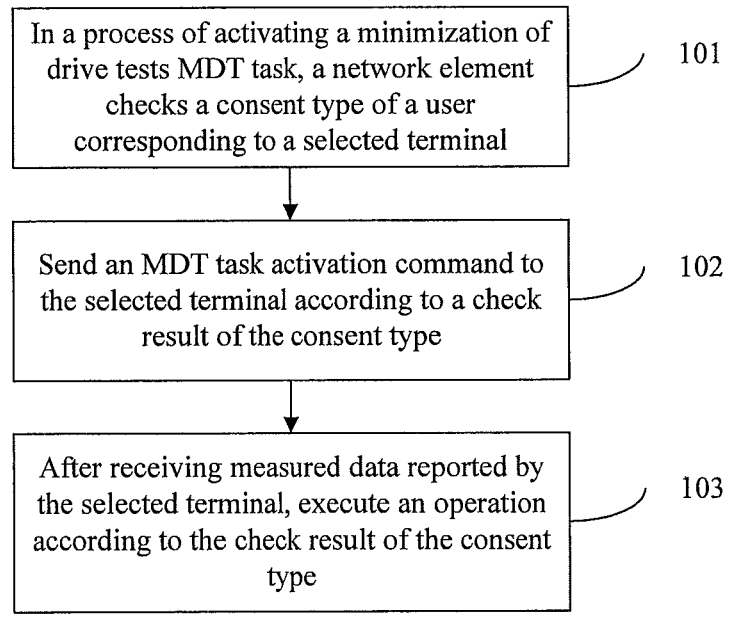
FIG. 1 is a flowchart of a method for minimization of drive tests according to a first embodiment of the present invention.

As shown in FIG. 1, this embodiment of the present invention provides a method for minimization of drive tests, including:

Step 101: In a process of activating a minimization of drive tests MDT task, a network element checks a consent type of a user corresponding to a selected terminal.

Step 102: Send a MDT task activation command to the selected terminal according to a check result of the consent type.

Step 103: After receiving measured data reported by the selected terminal, execute an operation according to the check result of the consent type.

In this embodiment, optionally, the consent type of the user includes a first type, where the first type is a consent type of the user indicating whether the terminal user agrees to execute a MDT task.

The first type is pre-configured on a home subscriber server (HSS) and/or a long-term evolved NodeB (eNB) and/or a radio network controller (RNC).

Accordingly, the checking, by a network element, a consent type of the user corresponding to the selected terminal and sending a MDT task activation command to the selected terminal according to the check result of the consent type, include:

checking, by the HSS and/or the eNB and/or the RNC, whether the selected terminal user agrees to execute the MDT task;

if the check result is that the terminal user agrees to execute the MDT task, sending a corresponding MDT task activation command to the selected terminal; and if the check result is that the selected terminal user does not agree to execute the MDT task, returning a check failure to an Operations, Administration and Maintenance (OAM), so that the OAM terminates the process of activating the MDT task, and stopping sending a MDT activation command.

In this embodiment, optionally, the consent type of the user includes a second type, where the second type is a consent type indicating whether the terminal user agrees to report a user identifier forcibly or report a user identifier anonymously for the MDT task if the terminal user agrees to execute the MDT task.

The user identifier includes an individual mobile station identity (IMSI), or an International Mobile Equipment Identity (International Mobile Equipment Identity, IMEI), or a telephone number of the user.

Further, in this embodiment, the second type of consent is pre-configured on the eNB and/or the RNC.

Accordingly, the checking, by the network element, a consent type of a user corresponding to the selected terminal, sending a MDT task activation command to the selected terminal according to the check result of the consent type, and after receiving measured data reported by the selected terminal, executing an operation according to the check result of the consent type, include:

checking, by the eNB and/or the RNC, whether the terminal user agrees to report the user identifier or report the user identifier anonymously;

if the check result is that the terminal user agrees to report the user identifier, sending, by the eNB and/or the RNC, a MDT activation command to the terminal, and adding corresponding user identifier information to the reported MDT data that is received or allowing the data to carry the user identifier information; and if the check result is that the terminal user does not agree to report the user identifier or report the user identifier anonymously, sending, by the eNB and/or the RNC, a MDT activation command that carries no parameter requiring to report a user identifier and does not support IMSI query, for the MDT task; after receiving the MDT data, disallowing, by the eNB and/or the RNC, to carry user identifier information in the reported data, and returning a check failure and a failure type number corresponding to the failure to an OAM, so that the OAM learns a consent type that fails to pass the check.

In this embodiment, when the network element is the eNB, after sending a MDT task activation command to the selected terminal according to the check result of the consent type, the method further includes:

if the check result is that the selected terminal user agrees to report the user identifier, forwarding a query request to a network element on a core network, so that the network element on the core network sends the user identifier to a MDT data collection device to associate the user identifier with the reported MDT data; and if the check result is that the selected terminal user does not agree to report the user identifier, skipping forwarding, by the eNB, a user identifier query request to the network element on the core network; and after receiving data that carries the user identifier, skipping reporting the data that carries the user identifier.

In this embodiment, if the check result is that the selected terminal user does not agree to report the user identifier or needs to report the user identifier anonymously, the method further includes:

converting, by the eNB and/or the RNC, the user identifier into a user number or a service number, where the user number or the service number is an identifier used by the terminal for reporting anonymously.

Optionally, in this embodiment, the consent type of the user includes a third type, where the third type is a consent type of the user indicating whether the terminal user agrees to report position information and/or desired positioning mode forcibly for the MDT task if the terminal user agrees to execute the MDT task.

The third type is pre-configured on a mobility management entity (Mobility Management Entity, MME) and/or a general packet radio service (General Packet Radio Service, GPRS) serving GPRS support node (Serving GPRS support node, SGSN) and/or a mobile switching center (Mobile Switching Center, MSC) and/or the eNB and/or the RNC.

Accordingly, the checking, by the network element, a consent type of a user corresponding to the selected terminal, sending a MDT task activation command to the selected terminal according to the check result of the consent type, and after receiving corresponding measured data reported by the selected terminal, executing an operation according to the check result of the consent type, include:

checking, by the MME and/or the SGSN and/or the MSC and/or the eNB and/or the RNC, whether the selected terminal user agrees to report position information, and/or specifying a positioning mode if the selected terminal user agrees to report the position information;

if the check result is that the selected terminal user agrees to report position information and allows the use of the specified positioning mode, sending, by the MME and/or the SGSN and/or the MSC and/or the eNB and/or the RNC, a MDT activation command to the terminal and/or assisting the terminal in performing positioning query; and if the check result is that the selected terminal user does not agree to report position information but allows the use of the specified positioning mode, sending, by the MME and/or the SGSN and/or the MSC and/or the eNB and/or the RNC, a corresponding MDT task activation command to the terminal, where the MDT task activation command does not support related positioning query, and returning a check failure and a failure type number corresponding to the failure to an OAM, so that the OAM learns a consent type that fails to pass the check.

Optionally, in this embodiment, the consent type of the user includes a fourth type, where the fourth type indicates whether the terminal user agrees to report data related to quality or experience of an upper layer service for the MDT task forcibly if the terminal user agrees to execute the MDT task.

Further, in this embodiment, the fourth type is pre-configured on a home subscriber server HSS and/or a serving gateway (Serving Gate Way, S-GW) and/or a packet gateway (Packet Gate Way, P-GW).

Accordingly, the checking, by the network element, a consent type of a user corresponding to the selected terminal, sending a MDT task activation command to the selected terminal according to the check result of the consent type, and after receiving measured data reported by the selected terminal, executing an operation according to the check result of the consent type, include:

checking, by the HSS and/or the S-GW and/or the P-GW, whether the terminal user agrees to report data related to quality or experience of an upper layer service;

if the check result is that the selected terminal user agrees to report data related to quality or experience of an upper layer service, sending, by the HSS and/or the S-GW and/or the P-GW, a command for activating data related to the quality or experience of an upper layer service to the terminal; and if the check result is that the selected terminal user does not agree to report data related to the quality or experience of an upper layer service, sending, by the HSS and/or the S-GW and/or the P-GW, a MDT task activation command, where the MDT task activation command does not require the terminal to report data related to quality or experience of an upper layer service, or, skipping forwarding, by the HSS and/or the S-GW and/or the P-GW, obtained data related to the upper layer service of the user to a MDT data collection device.

Optionally, in this embodiment, the user consent type includes limitation of a geographical area and/or duration.

In this embodiment, the checking, by the network element, a consent type of the user corresponding to the selected terminal and sending a MDT task activation command to the selected terminal according to the check result of the consent type, include:

checking whether local conditions meet the limitation of the geographical area and/or duration in the consent type;

if the check result is that the local conditions meet the limitation of the geographical area and/or duration in the consent type, determining that the consent type requirement is valid, and sending a MDT task activation command to a terminal executing the MDT task according to the check result of the consent type; and if the check result is that the local conditions do not meet the limitation of the geographical area and/or duration in the consent type, determining that the consent type requirement is invalid and all check results based on the consent type are negative; in addition, reporting, by a network element, a check failure and a failure type number corresponding to the failure to a MDT data collection device; sending, by the network element, a MDT task activation command to a terminal executing the MDT task according to a consent type that passes the check.

In the technical solution provided in the first embodiment, check on user consent is implemented in a network detection process; and the execution of a MDT task or a terminal information collection task is controlled according to the user consent, which fully considers the user experience, thereby avoiding a case that a user equipment is forced to report personal information without permission of the user.

Embodiment 2

Figure 2:
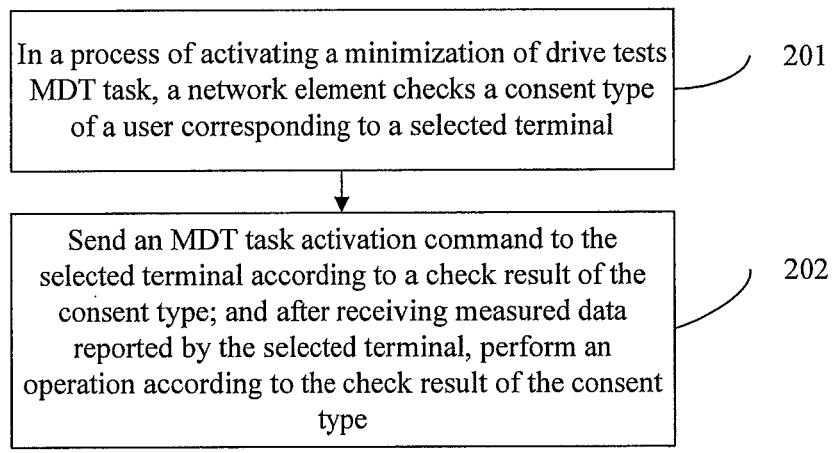
FIG. 2 is a flowchart of a method for minimization of drive tests according to a second embodiment of the present invention.

As shown in FIG. 2, a second embodiment of the present invention provides a method for minimization of drive tests, including:

Step 201: In a process of activating a minimization of drive tests MDT task, a network element checks a consent type of a user corresponding to a selected terminal.

In this embodiment, user consent is added in the network detection, so that a terminal user has rights to decide whether to participate in the MDT task. The user consent can be obtained by using customer services of the operators, and a network management system or a user management system pre-configures the obtained user consent on MDT-related network elements; when the network management activates different types of MDT tasks, the network management performs user consent (Consent) related tests for the activation command on different network elements, so as to check whether the MDT tasks activated by the network management meet the user consent.

In this embodiment, the user consent is divided into four types: a first type, indicating whether the terminal user agrees to execute the MDT; a second type, indicating whether the terminal user agrees to report an IMSI for the MDT task forcibly; a third type, indicating whether the terminal agrees to report position information for the MDT task forcibly; a fourth type, indicating whether the terminal agrees to report experience of an upper layer service for the MDT task forcibly. The consent indicating whether the user agrees to execute the MDT reflects whether the user currently allows his/her terminal to execute the MDT task and report. Further, if the user agrees to execute the MDT task, it is still necessary to indicate whether the user agrees to report the identifier of his/her terminal (for example, IMSI) together with the task data. Because the terminal identifier is a part of individual primacy, the Consent reflects whether the user agrees to disclose part of his/her individual privacy for the MDT. Further, if the user agrees to execute the MDT task, it is still necessary to indicate whether the user agrees to report his/her position (for example, the global positioning system (Global Positioning System, GPS) longitude and altitude, the position of the eNB where the user is located) together with the MDT task data and the specific positioning mode. Because personal position information is a part of the individual privacy, this Consent reflects whether the user agrees to disclose part of his/her individual privacy for the MDT. Further, if the user agrees to execute the MDT task, it is still necessary to indicate whether the user agrees to report data of experience of upper layer applications and an upper layer service (for example, uplink and downlink IP service rate/total traffic, channel quality indicator (Channel Quality Indicator, CQI), quality of experience (Quality of Experience, QoE) and other user experience data) in the MDT task data. Because the experience of upper layer applications and services may already go beyond the range of transmission level of the operators' network, such experience data needs to be agreed by the user; otherwise, individual business data is peeped. Therefore, this kind of data can be collected only with consent of the user.

Further, in this embodiment, optionally, the pre-configured user Consents may further carry several attributes. Each type of Consent corresponding to these attributes is made for each terminal identifier (for example, the IMSI). The attributes include limitation of a geographical area range and duration of the user consent type, indicating whether a user agrees to execute a corresponding MDT task (specific content depend on the Consent type) in a specific geographical area and in a specific duration by using his/her terminal (indicated by the IMSI or the like). The attributes can provide policy support for the user in setting the consent of executing the MDT, making the MDT consent control process automatic. By setting the consent once in different ranges and validity periods, a case that the Consent needs to be set multiple times in different scenarios is avoided, thereby reducing unnecessary and frequent modifications to the network.

Step 202: Send a MDT task activation command to a terminal executing the MDT task according to the check result of the consent type, and execute an operation according to the check result of the consent type after receiving measured data reported by the terminal executing the MDT task.

In this embodiment, different user consent types are configured on different network elements, so as to manage the user consent types. Different user terminals correspond to different user identifiers, and the user identifiers and the consent types of the terminal users are configured in turn, so that the network element checks the consent types of the terminals subsequently. Specifically, for a type 1 Consent, check whether a user of the IMSI agrees to execute the MDT task. The Consent needs to be configured on the HSS (for the signaling-based MDT check) or the eNB/RNC (for the management-based MDT check). Because these network elements check the access or identity of the UE and also receive the MDT activation command directly from the OAM, the network elements can directly check whether the UE can execute the MDT. For the second type of Consent, the network element checks whether the user agrees to add the terminal identifier of a terminal to be measured (for example, the IMSI) to the reported MDT task data. This Consent type is provided only for the management-based MDT, and therefore it should be configured on the eNB/RNC because the eNB/RNC is responsible for initiating an IMSI query request to the core network. If the user does not agree to report such privacy as the IMSI, the eNB/RNC cannot initiate a terminal identifier query request or an IMSI report request, thereby preventing the network from discovering a corresponding terminal. For the third type of Consent, the network element checks whether the user agrees to add position information of the measured terminal and the specific positioning type (for example, GPS position or position information obtained by cell positioning, and the like) to the MDT task data forcibly. This Consent type is configured on the MME/SGSN/MSC (signaling-based MDT) or the eNB/RNC (management-based MDT). These network elements can decide whether to initiate an observed time difference of arrival (Observed Time Difference Of Arrival, OTDOA) request or a GPS position query request to the user. If the user does not agree to disclose such privacy and the Consent check fails, these network elements do not initiate any position request. As a result, the position information of the corresponding terminal cannot be obtained in the process of executing the MDT task.

For the fourth type of Consent, the network element checks whether the user agrees to add measured values of experience of higher layer user applications and an upper layer service to the reported MDT task data. The specific services of the user belong to his/her privacy, and also relate to his/her business secrets. However, because this type of data is directly conducive to the optimization of transport network or services, the user has rights to decide whether to agree to this type of measurement. The corresponding Consent is configured on the HSS or the S-GW/P-GW.

Figure 3:
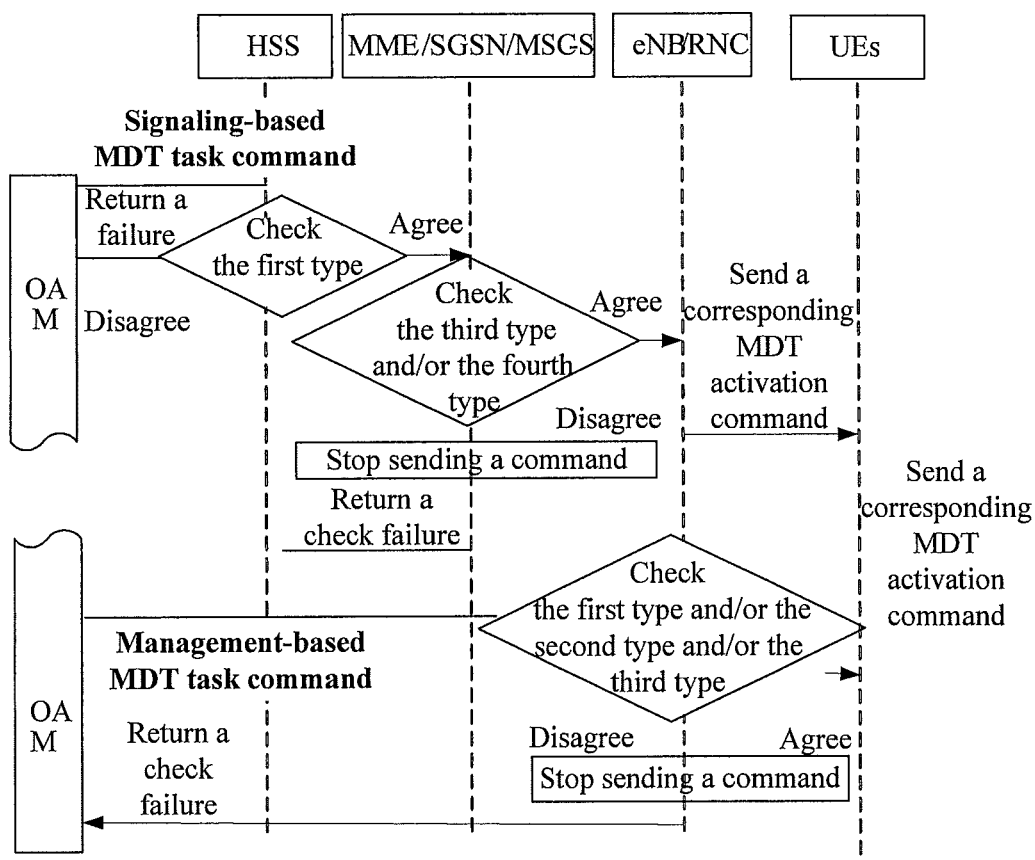
FIG. 3 is a flowchart of a management-based and a signaling-based method for minimization of drive tests according to the second embodiment of the present invention.

After the foregoing different user consent types are preconfigured on different network elements, in this embodiment, for the signaling-based MDT, corresponding network elements include the HSS, the MME, the SGSN, and the MSC. The Consent corresponding to each terminal is configured on the HSS (the first type of Consent) or the MME, the SGSN, or the MSC (the third type and fourth type of Consent). The specific process is shown in FIG. 3:

(1) After receiving an activation command, the HSS checks whether the types of user corresponding to a specified user identifier (for example, the IMSI) include the first type of Consent according to the specified user identifier. If the check fails, the user does not agree to support the MDT, and the HSS returns a check failure. In response to the failure, the OAM terminates the MDT activation process.

(2) If finding that the user identifier corresponds to the third type and fourth type of Consent, the HSS transfers the activation command to the MME/SGSN/MSC; the MME/SGSN/MSC checks whether the user agrees to execute a MDT report (for example, Location or upper layer service measurement task) according to the corresponding user identifier; if the check fails, the network element returns a failure (for example, a Check Failure and a corresponding Consent type number); in addition, according to the third type of Consent, the network element no longer participates in related IMSI Location query request in the MDT task; according to the fourth type of Consent, the network element filters out measured items related to the upper layer service from the MDT configuration, and then transfers the MDT configuration to the eNB/RNC.

Further, in this embodiment, for the management-based MDT, corresponding network elements include the eNB/RNC. When the management-based MDT is activated, the command that is sent does not include user identifier information. Therefore, after selecting terminals, the eNB/RNC performs check once to decide which selected terminals can be activated and used in the MDT task; after filtering out those terminals that do not agree to support the MDT or some MDT functions, the eNB/RNC activates the MDT. As shown in FIG. 3, specifically, in this embodiment, the first type, second type, and third type of Consent can be identified by the RNC by using user identifiers. Therefore, the RNC queries a corresponding Consent (if no Consent is found, the MDT is not supported by default) by using a corresponding user identifier (for example, the IMSI), filters out terminals failing to pass the check, and returns a check failure and a failure type number corresponding to the failure to the OAM, so that the OAM learns a consent type that fails to pass the check. The remaining terminals are configured with a corresponding MDT configuration.

Because the eNB cannot identify terminal identifiers (for example, the IMSI) and can only identify temporary identifiers (for example, the TMSI or the RTNC), the eNB needs to query the MME for user Consent details corresponding to the temporary identifiers, and then performs check on terminals; the eNB filters out terminals failing to pass the check, and returns a check failure and a corresponding type number to the OAM, so that the OAM learns a consent type that fails to pass the check. The remaining terminals are configured with a corresponding MDT configuration.

Figure 4:
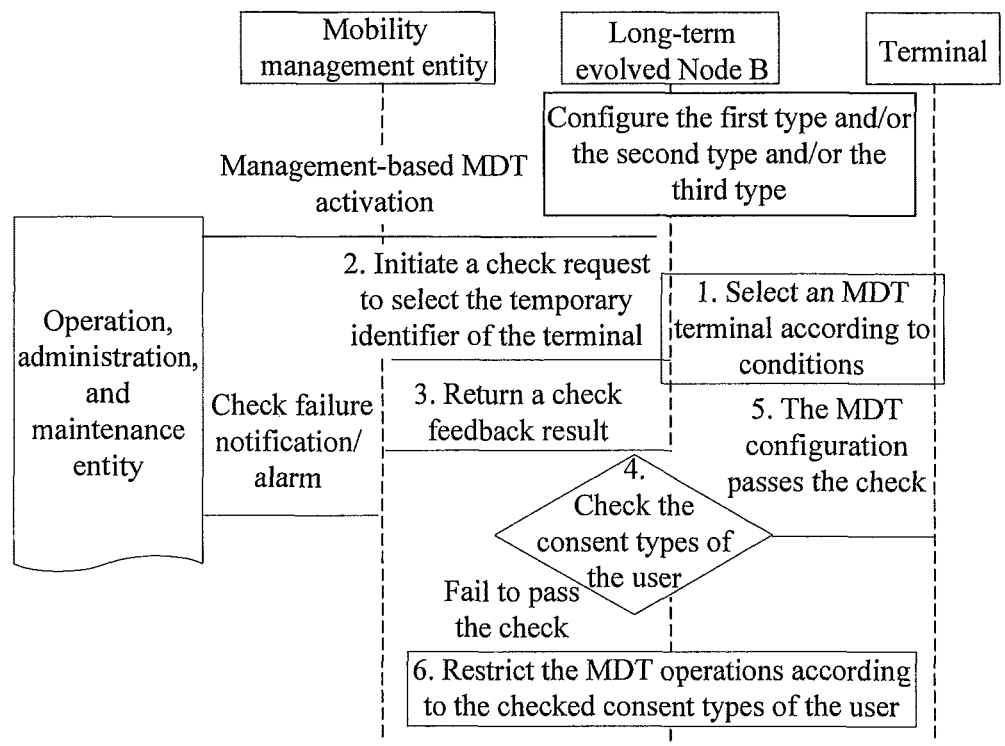
FIG. 4 is a flowchart of a method for obtaining a consent type of a user corresponding to a terminal by an eNB in a process of activating a MDT task according to a second embodiment of the present invention.

Further, for the management-based MDT, if the eNB or the RNC cannot perform Consent check on users of each terminal identifier, for example, the Consent is set according to such identifiers/identities that the eNB cannot see as the IMSI, IMEI, and P-ID (IMS Public id) of each user, the eNB or the RNC needs to request the core network for check or request the MME for a mapping relationship between the identifiers and the temporary user identifiers on the eNB (before activating the MDT task or during the process of activating the MDT task), so that the eNB or the RNC checks the Consent locally. This embodiment is based on the eNB. As shown in FIG. 4, in the process of activating a MDT task, the step of querying the core network and/or the MME for a consent type of the terminal by the eNB is specifically as follows:

1. After receiving a MDT activation command, the eNB executes terminal selection (selects terminals according to sent selection conditions by referring to the existing selection processes).

2. After selecting UEs, the eNB initiates a check request (for example, Check Request) to the MME by using a temporary access identifier list (for example, a TMSI List).

3. After receiving a check request, the MME performs check and returns check feedback (for example, Check Response) to the eNB, where the feedback includes such content as a Consent type corresponding to each temporary identifier (terminal), where the content may be Consent lists returned in sequence.

4. After receiving the feedback, the eNB filters terminals, removes those terminals that do not support the MDT, and select terminals passing the check as terminals executing the MTD.

5. If the Consent check succeeds, the eNB includes the checked Consent configuration passing the check in MDT configuration information (for example, the MDT Configuration), and then sends the MDT configuration information to a corresponding MDT terminal, where the MDT configuration information include the second type, third type, and fourth type of Consent (for the first type of Consent, the MDT is executed directly); the terminal performs measurement and reporting by using the existing MDT processes according to such Consent limitation.

6. If some or all Consent checks fail, the eNB restricts operations of terminals that fail to pass the check locally.

(a) For terminals that fail to pass the check of the first type of Consent, the eNB clears the selection of the terminals, and do not send any MDT-related configurations to these terminals.

(b) For terminals that pass the check of the first type of consent but fail to pass the check of the second type of consent, the eNB does not initiate an IMSI identity query (Trace Information) request to prevent the core network from obtaining a corresponding user identifier.

(c) For terminals that pass the check of the first type of consent but fail to pass the check of the third type of consent, the eNB does not initiate a position query request (over the LPPA protocol) to prevent network elements on the core network from obtaining the position information of the user.

(d) For terminals that pass the check of the first type of consent but fail to pass the check of the fourth type of consent, if the activation command includes measured items of MDT upper layer services, the eNB terminates configuring the measured items for these terminals; if terminals still report these measured items subsequently, the eNB does not forward the data to the TCE.

In this embodiment, optionally, before activating the MDT task, the eNB obtains a consent type of a user corresponding to a terminal, so as to perform check when executing the MDT task subsequently. The obtaining the consent type of the user corresponding to the terminal includes:

(1) Pre-configuring the user consent type information on the HSS or the MME; when the terminal accesses a network, obtaining, by the HSS/MME, a terminal user identifier, and obtaining pre-configured user consent type information according to the terminal user identifier; and sending the user content types of the terminal to the eNB/RNC through a feedback message of the HSS.

(2) Pre-configuring user consent type information on the terminal; when initiating a connection request and setting up connection with an evolved UMTS terrestrial radio access network, carrying, by the terminal, user consent type information in a setup complete message, so that the evolved UMTS terrestrial radio access network obtains the consent type information of the terminal user. Specifically, when the UE switches from the idle state to the connection state, the UE initiates a connection setup request; the network configures the UE to perform connection setup; after completing the setup, the UE carries User consent information in a setup complete message. In this way, the network can decide, according to the User consent information reported by the UE, whether to select this UE to perform MDT configuration and what MDT configuration is performed.

(3) When the terminal performs handover, sending, by a source eNB, a handover request to a target eNB, where the handover request carries a user consent type of the terminal, and obtaining, by the target eNB, the user consent type of the terminal. Specifically, in the handover process of the UE, the network transfers User consent information through an interface message. When the source eNB sends a handover request to the target eNB, the user consent information may be carried in the handover request sent to the target eNB. In this way, the target eNB can learn the user consent of the UE. In this way, the target eNB can directly configures, in a handover reconfiguration message, the UE to perform a proper MDT, or after the UE is handed over to the target eNB, the eNB configures the UE to perform a proper MDT according to the user consent of the UE.

Optionally, in this embodiment, before the eNB obtains the consent type of the user corresponding to the terminal, the method further includes: determining, by the MME, whether the selected terminal is in a roaming state; if the terminal is in a roaming state, refusing, by the MME, to send a user consent type corresponding to the terminal to the eNB, or modifying the user consent type corresponding to the terminal to a consent type indicating that the execution is disagreed, and sending the modified consent type of the user corresponding to the terminal to the eNB.

In this embodiment, a network element receives a notification from the MME or a report from the selected terminal, and learns whether the selected terminal is in a roaming state. Optionally, before the network element checks the consent type of the user corresponding to the selected terminal, the method further includes: determining whether the selected terminal is in a roaming state; if the terminal is not in a roaming state, selecting the terminal not in a roaming state as a terminal executing the MDT task. Specifically, the learning the roaming state of the terminal by the MME includes: when the UE accesses a network, obtaining, by the MME, the IMSI of the UE, where the IMSI of the UE includes a home public land mobile network (Public Land Mobile Network, PLMN) of the UE; determining, by the MME, whether the UE is a roaming user according to whether the main PLMN of the MME is the same as the home PLMN of the UE, and notifying the eNB of the result. Further, the eNB can select the UE to perform MDT according to this information. For example, if the UE is a roaming user, the UE is not selected to perform MDT.

The learning whether the terminal is in a roaming state by the eNB according to the report from the terminal includes: when the UE accesses a network and is registered with the PLMN, determining, by the MME, whether the UE is a roaming user according to whether the home PLMN included in the IMSI of the MME is the same as the PLMN where the UE is registered, and notifying the eNB of the result. Further, the eNB can select the UE to perform MDT according to this information. For example, if the UE is a roaming user, the UE is not selected to perform MDT.

Further, in this embodiment, the UE determines whether to accept the MDT configuration according to whether the UE is a roaming user. In this case, the eNB does not need learn whether the user is a roaming user, but the user makes determination on his/her own. When the UE is in a roaming state, the UE receives logged MDT (logged MDT) configurations from the network. The user can determine that the measurement is a MDT configuration according to the signaling. Because the UE learns that the UE is a roaming user, the UE does not respond to the MDT configuration, that is, it does not perform MDT measurement and may further delete the MDT configuration. The eNB may also configures an immediate MDT (Immediate MDT) for the UE; when the UE is configured with the Immediate MDT, if the network configures the UE to report position information, the UE can determine that the configuration is an Immediate MDT configuration. If the UE is a roaming user, the UE may not respond to the measurement or only responds to the RRM measurement of the measurement, that is, the UE only reports the RRM measurement, but the RRM measurement is not carried as MDT destination position information.

The technical solution provided in the second embodiment has the following beneficial effect: Check on user consent is implemented in a process; and the execution of a MDT task is controlled according to the user consent, which fully considers the user experience, thereby avoiding a case that a user is forced to participate in a MDT task without permission of the user.

Embodiment 3

Figure 5:
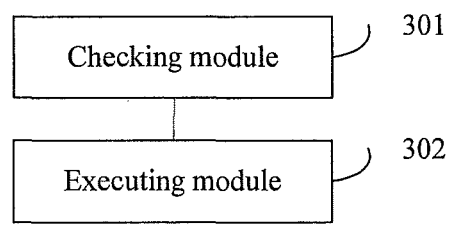
FIG. 5 is a schematic structural diagram of a network element according to a third embodiment of the present invention.

As shown in FIG. 5, based on the first embodiment and the second embodiment, a third embodiment of the present invention provides a network element, including a checking module 301 and an executing module 302.

The checking module 301 is configured to: in a process of activating a minimization of drive tests MDT task, check, for the network element, a consent type of a user corresponding to a selected terminal.

The executing module 302 is configured to: send a MDT task activation command to the selected terminal according to a check result of the consent type; and after receiving measured data reported by the selected terminal, execute an operation according to the check result of the consent type.

Figure 6:
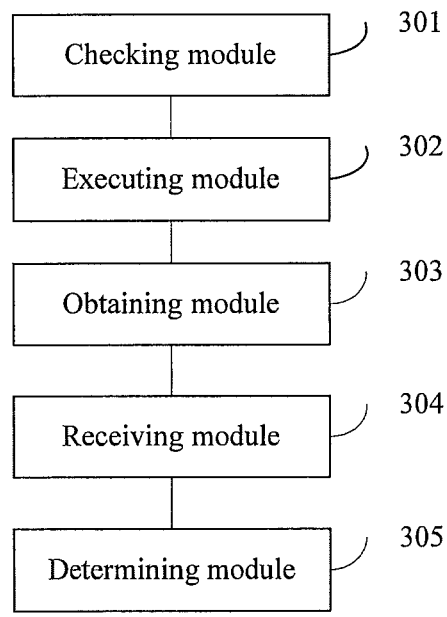
FIG. 6 is a schematic structural diagram of another network element according to the third embodiment of the present invention.

As shown in FIG. 6, when the network element in this embodiment is an eNB, the network element further includes:

an obtaining module 303, configured to: before checking the consent type of the user corresponding to the selected terminal, obtain the consent type of the user corresponding to the selected terminal.

As shown in FIG. 6, when the network element in this embodiment is an eNB, the network element further includes:

a receiving module 304, configured to receive a notification from an MME or a report from the selected terminal, and learn whether the selected terminal is in a roaming state; and a determining module 305, configured to: before the network element checks the consent type of the user corresponding to the selected terminal, determine whether the selected terminal is in a roaming state; and if the selected terminal is not in a roaming state, select the terminal not in a roaming state as a terminal executing the MDT task.

Figure 7:
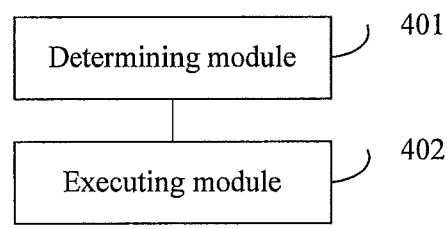
FIG. 7 is a schematic structural diagram of another network element according to the third embodiment of the present invention.

As shown in FIG. 7, the third embodiment of the present invention also provides another network element, where the network element may be an MME, including a determining module 401 and an executing module 402.

The determining module 401 is configured to determine whether the selected terminal is in a roaming state.

The executing module 402 is configured to: if the selected terminal is in a roaming state, for the network element, refuse to send a consent type of the user corresponding to the selected terminal to the eNB, or modify a user consent type corresponding to the terminal to be a consent type indicating that execution is disagreed, and send the modified user consent type corresponding to the terminal to the eNB.

The technical solution provided in the second embodiment has the following beneficial effect: Check on user consent is implemented in a process; and the execution of a MDT task is controlled according to the user consent, which fully considers the user experience, thereby avoiding a case that a user is forced to participate in a MDT task without permission of the user.

Embodiment 4

Figure 8:
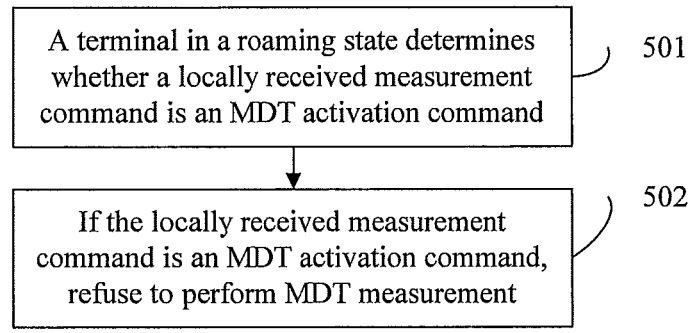
FIG. 8 is a flowchart of a method for minimization of drive tests according to a fourth embodiment of the present invention.

As shown in FIG. 8, based on the first embodiment and the second embodiment, a fourth embodiment of the present invention further provides a method for minimization of drive tests. The executive subject of the fourth embodiment of the present invention is a terminal in a roaming state, including:

Step 501: The terminal in a roaming state determines whether a locally received measurement command is a MDT activation command.

Step 502: If the locally received measurement command is a MDT activation command, refuse to perform MDT measurement.

The technical solution provided in this embodiment has the following beneficial effect: The terminal can decide whether to perform MDT measurement according to whether the terminal is in a roaming state, thereby improving the user experience.

Embodiment 5

Figure 9:
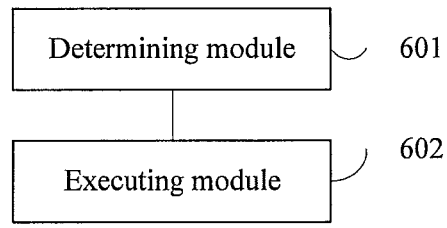
FIG. 9 is a schematic structural diagram of a terminal according to a fifth embodiment of the present invention.

As shown in FIG. 9, based on the fourth embodiment, a fifth embodiment of the present invention provides a terminal, where the terminal is in a roaming state, including a determining module 601 and an executing module 602.

The determining module 601 is configured to determine whether a locally received measurement command is a MDT activation command.

The executing module 602 is configured to: if the determination result of the determining module is true, refuse to perform MDT measurement.

The technical solution provided in this embodiment has the following beneficial effect: The terminal can decide whether to perform MDT measurement according to whether the terminal is in a roaming state, thereby improving the user experience.

Embodiment 6

Figure 10:
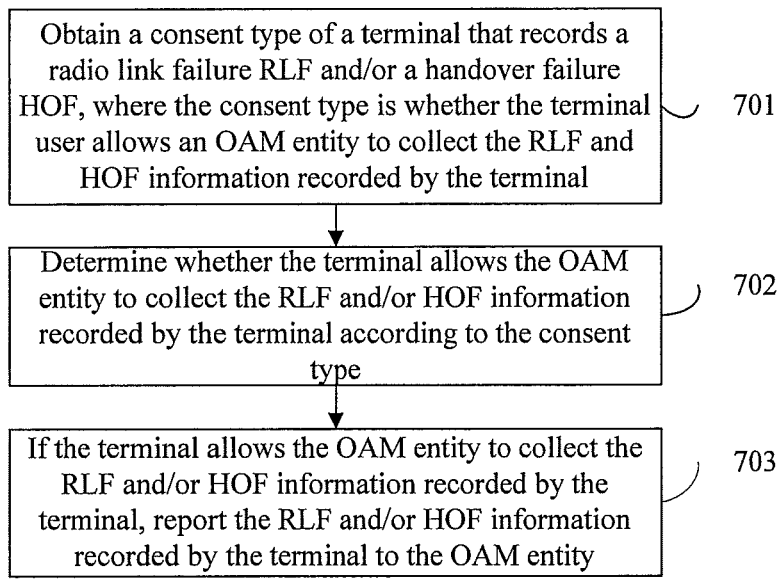
FIG. 10 is a flowchart of a method for collecting terminal information according to a sixth embodiment of the present invention.

As shown in FIG. 10, a sixth embodiment of the present invention also provides a method for collecting terminal information, including:

Step 701: Obtain a consent type of a terminal that records a radio link failure (Radio Link Failure, RLF) and/or a handover failure (Handover Failure, HOF), where the consent type is whether the terminal user allows an OAM entity to collect the RLF and HOF information recorded by the terminal.

Step 702: Determine whether the terminal allows the OAM entity to collect the RLF and/or HOF information recorded by the terminal.

Step 703: If the terminal allows the OAM entity to collect the RLF and/or HOF information recorded by the terminal, report the RLF and/or HOF information recorded by the terminal to the OAM entity.

Currently, the UE records and reports some MDT measurements according to network configurations. In addition, when an RLF or an HOF occurs on the UE, the UE records details about the occurrence of the RLF and the HOF, and reports the recorded details to the eNB at a proper time. When an RLF occurs on the UE, the information that needs to be recorded by the UE includes: (1) identifiers of the serving cell and neighbor cells before the RLF occurs on the UE; (2) signal strength of the serving cell and neighbor cells before the RLF occurs on the UE; (3) a geographic position message when the RLF occurs. When an HOF occurs on the UE, information that the UE needs to be recorded by the UE includes: (1) cell identifiers of cells where UE handover and UE access fail; (2) signal strength of the serving cell and neighbor cells in the case of UE handover; (3) valid geographic position information in the case of access failure.

The technical solution provided in this embodiment has the following beneficial effect: The network element can decide whether to report the terminal information according to a user consent type of the terminal, which fully considers the consent of the terminal user, thereby improving the user experience.

Embodiment 7

Figure 11:
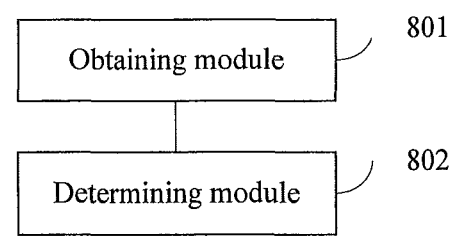
FIG. 11 is a schematic structural diagram of a network element according to a seventh embodiment of the present invention.

As shown in FIG. 11, based on the sixth embodiment, a seventh embodiment of the present invention provides a network element, including an obtaining module 801 and a determining module 802.

The obtaining module 801 is configured to record a consent type of a terminal that records an RLF and/or an HOF, where the consent type is whether the terminal user allows an OAM entity to collect the RLF and HOF information recorded by the OAM entity.

The determining module 802 is configured to: determine whether the terminal allows the OAM entity to collect the RLF and/or HOF information according to the consent type; and if the terminal allows the OAM entity to collect the RLF and/or HOF information, report the RLF and/or HOF information recorded by the terminal to the OAM entity.

The technical solution provided in this embodiment has the following beneficial effect: The network element can decide whether to report the terminal information according to a user consent type of the terminal, which fully considers the consent of the terminal user, thereby improving the user experience.

The network elements and terminal provided in embodiments of the present invention belong to the same idea as the method provided in an embodiment of the present invention. For details about the specific implementation processes of the network element and terminal, reference may be made to the method embodiment, and are not further described.

All or part of the foregoing technical solutions provided in the embodiments of the present invention may be implemented by a program instructing relevant hardware. The program may be stored in a readable storage medium, and the storage medium may include any medium that is capable of storing program codes, such as a ROM, a RAM, a magnetic disk, or an optical disk.

The foregoing descriptions are merely exemplary embodiments, but are not intended to limit the present invention. Any modification, equivalent replacement, or improvement made within the principle of the present invention shall all fall within the protection scope of the present invention.

What is claimed is:

1. A method for minimization of drive tests (MDT), comprising:

in a process of activating a MDT task, checking, by an evolved Node B (eNB), a consent type of a user corresponding to a selected terminal, wherein the consent type of the user comprises a consent type of the user indicating whether the terminal user agrees to report position information and/or a desired positioning mode for the MDT task if the terminal user agrees to execute the MDT task, wherein the desired positioning mode comprises one of a mode of GPS and a mode of obtaining position information by cell position;

sending, by the eNB, a MDT task activation command to the selected terminal according to a check result of the consent type; and after receiving measured data reported by the selected terminal, performing, by the eNB, an operation according to the check result of the consent type, wherein the checking, by the eNB, the consent type of a user corresponding to the selected terminal, sending the MDT task activation command to the selected terminal according to the check result of the consent type, and after receiving the measured data reported by the selected terminal, performing the operation according to the check result of the consent type, comprise:

checking, by the eNB, whether the selected terminal user agrees to report position information and/or specifies the desired positioning mode if the selected terminal user agrees to report the position information;

if the check result is that the selected terminal user agrees to report position information and allows the use of the specified desired positioning mode, sending, by the eNB, an MDT activation command to the terminal and/or assisting the terminal in a positioning query; or if the check result is that the selected terminal user does not agree to report position information but allows the use of the specified desired positioning mode, sending, by the eNB, a corresponding MDT task activation command to the terminal, wherein the MDT task activation command does not support related positioning query, and returning a check failure and a failure type number corresponding to the failure to an Operations, Administration, and Maintenance (OAM) entity, so that the OAM entity learns the consent type that fails to pass the check.

2. The method according to claim 1, wherein before the checking, by the eNB, the consent type of a user corresponding to the selected terminal, the method further comprises:

obtaining, by the eNB, the consent type of the user corresponding to the selected terminal.

3. The method according to claim 2, wherein the obtaining, by the eNB, the consent type of the user corresponding to the selected terminal comprises:

sending, by the eNB, a temporary identifier of the terminal to a mobility management entity (MME), querying a consent type of the user corresponding to the temporary identifier, and receiving the consent type of the user corresponding to the temporary identifier returned by the MME.

4. The method according to claim 2, wherein the obtaining, by the eNB, the consent type of the user corresponding to the selected terminal comprises:

receiving, by the eNB, the consent type of the terminal from a mobility management entity (MME), wherein the consent type is queried locally by the MME according to the user identifier of the terminal when the terminal accesses a network.

5. The method according to claim 2, wherein the obtaining, by the eNB, the consent type of the terminal comprises:

receiving, by the eNB, a consent type of the terminal reported by the terminal, wherein the consent type is carried in a setup complete message after the selected terminal initiates a connection setup request and sets up a connection with the eNB.

6. The method according to claim 2, wherein the obtaining, by the eNB, the consent type of the terminal comprises:
receiving, by the eNB, the consent type of the terminal that the source base station of the terminal carries in a handover request.

7. The method according to claim 1, wherein before the eNB checks the consent type of the user corresponding to the selected terminal, the method further comprises:
determining, by the eNB, whether the selected terminal is in a roaming state according to a notification received from an MME or a report received from the terminal; and
if the selected terminal is not in a roaming state, selecting, by the eNB, the terminal as a terminal to execute the MDT task.

8. The method according to claim 1, wherein the consent type of the user further comprises a limitation of a geographical area and/or duration.

9. A network element, comprising:
an evolved Node B (eNB), comprising:
a checking module, configured to: in a process of activating a minimization of drive tests (MDT) task, check, a consent type of a user corresponding to a selected terminal, wherein the consent type of the user comprises a consent type of the user indicating whether the terminal user agrees to report position information and/or a desired positioning mode for the MDT task if the terminal user agrees to execute the MDT task, wherein the desired positioning mode comprises one of a mode of GPS and a mode of obtaining position information by cell position; and
an executing module, configured to: send an MDT task activation command to the selected terminal according to a check result of the consent type; and after receiving measured data reported by the terminal, execute an operation according to the check result of the consent type, wherein the modules configured to check, by the eNB, the consent type of a user corresponding to the selected terminal, send the MDT task activation command to the selected terminal according to the check result of the consent type, and after receiving the measured data reported by the selected terminal, execute the operation according to the check result of the consent type, further configured to:
check whether the selected terminal user agrees to report position information and/or specifying a positioning desired mode if the selected terminal user agrees to report the position information; and
if the check result is that the selected terminal user agrees to report position information and allows the use of the specified desired positioning mode, send an MDT activation command to the terminal and/or assisting the terminal in a positioning query; or
if the check result is that the selected terminal user does not agree to report position information but allows the use of the specified desired positioning mode, send a corresponding MDT task activation command to the terminal, wherein the MDT task activation command does not support related positioning query, and to return a check failure and a failure type number corresponding to the failure to an Operations, Administration, and Maintenance (OAM) entity, so that the OAM entity learns the consent type that fails to pass the check.

10. The network element according to claim 9, wherein the eNB further comprises:
an obtaining module, configured to: before checking the consent type of the user corresponding to the selected terminal, obtain the consent type of the user corresponding to the selected terminal.

11. The network element according to claim 9, wherein the eNB further comprising:
a receiving module, configured to receive a notification from a mobility management entity (MME) or a report from the selected terminal, and learn whether the selected terminal is in a roaming state; and
a determining module, configured to: before the network element checks the consent type of the user corresponding to the selected terminal, determine whether the selected terminal is in a roaming state; if the selected terminal is not in a roaming state, select the terminal not in a roaming state as a terminal executing the MDT task.

12. The network element according to claim 9, wherein the modules further configured to before the check, by the eNB, the consent type of a user corresponding to the selected terminal, obtain, by the eNB, the consent type of the user corresponding to the selected terminal by sending, by the eNB a temporary identifier of the terminal to a mobility management entity (MME), querying a consent type of the user corresponding to the temporary identifier, and receiving the consent type of the user corresponding to the temporary identifier returned by the MME.

13. The network element according to claim 9, wherein the modules further configured to before the check, by the eNB, the consent type of a user corresponding to the selected terminal, obtain, by the eNB, the consent type of the user corresponding to the selected terminal by receiving, by the eNB, the consent type of the terminal from a mobility management entity (MME), wherein the consent type is queried locally by the MME according to the user identifier of the terminal when the terminal accesses a network.

14. The network element according to claim 9, wherein the modules further configured to before the check, by the eNB, the consent type of a user corresponding to the selected terminal, obtain, by the eNB, the consent type of the user corresponding to the selected terminal by receiving, by the eNB, a consent type of the terminal reported by the terminal, wherein the consent type is carried in a setup complete message after the selected terminal initiates a connection setup request and sets up a connection with the eNB.

15. The network element according to claim 9, wherein the modules further configured to before the check, by the eNB, the consent type of a user corresponding to the selected terminal, obtain, by the eNB, the consent type of the user corresponding to the selected terminal by receiving, by the eNB, the consent type of the terminal that the source base station of the terminal carries in a handover request.

16. The network element according to claim 9, wherein the consent type of the user further comprises a limitation of a geographical area and/or duration.

17. A method for minimization of drive tests (MDT), comprising:
in a process of activating a MDT task, checking, by an evolved Node B (eNB), a consent type of a user corresponding to a selected terminal, wherein the consent type of the user comprises a consent type of the user indicating whether the terminal user agrees to report position information and/or a specifies desired positioning mode for the MDT task if the terminal user agrees to execute the MDT task, wherein the desired positioning mode comprises one of a mode of GPS and a mode of obtaining position information by cell position;
sending, by the eNB, a MDT task activation command to the selected terminal according to a check result of the consent type; and after receiving measured data reported by the selected terminal, performing, by the eNB, an operation according to the check result of the consent type, wherein the consent type of the user further comprises a limitation of a geographical area and/or duration, wherein the checking, by an eNB, the consent type of a user corresponding to the selected terminal and sending the MDT task activation command to the selected terminal according to the check result of the consent type, comprise:

checking, by the eNB, whether local conditions meet the limitation of the geographical area and/or duration in the consent type;

if the check result is that the local conditions meet the limitation of the geographical area and/or duration in the consent type, determining, by the eNB, that the consent type requirement is valid, and sending, by the eNB, an MDT task activation command to a terminal executing the MDT task according to the check result of the consent type; or if the check result is that the local conditions do not meet the limitation of the geographical area and/or duration in the consent type, determining, by the eNB, that the consent type is invalid and all check results based on the consent type are negative; reporting, by the eNB, the check failure and a failure type number to an MDT data collection device; sending, by the eNB, an MDT task activation command to a terminal executing the MDT task according to a consent type that passes the check.

18. A network element comprising:

an evolved Node B (eNB), comprising:

a checking module, configured to: in a process of activating a minimization of drive tests (MDT) task, check, a consent type of a user corresponding to a selected terminal, wherein the consent type of the user comprises a consent type of the user indicating whether the terminal user agrees to report position information and/or a desired positioning mode for the MDT task if the terminal user agrees to execute the MDT task, wherein the desired positioning mode comprises one of a mode of GPS and a mode of obtaining position information by cell position; and an executing module, configured to: send an MDT task activation command to the selected terminal according to a check result of the consent type; and after receiving measured data reported by the terminal, execute an operation according to the check result of the consent type, wherein the consent type of the user further comprises a limitation of a geographical area and/or duration, wherein modules configured to check, by the eNB, the consent type of a user corresponding to the selected terminal and send the MDT task activation command to the selected terminal according to the check result of the consent type, further configured to:

check, by the eNB, whether local conditions meet the limitation of the geographical area and/or duration in the consent type;

if the check result is that the local conditions meet the limitation of the geographical area and/or duration in the consent type, determine, by the eNB, that the consent type requirement is valid, and send, by the eNB, an MDT task activation command to a terminal executing the MDT task according to the check result of the consent type; or if the check result is that the local conditions do not meet the limitation of the geographical area and/or duration in the consent type, determine, by the eNB, that the consent type is invalid and all check results based on the consent type are negative; report, by the eNB, the check failure and a failure type number to an MDT data collection device; send, by the eNB, an MDT task activation command to a terminal executing the MDT task according to a consent type that passes the check.

* * * * *